United States Patent [19]

Recchia et al.

[11] Patent Number: 5,430,111

[45] Date of Patent: Jul. 4, 1995

[54] HIGH SOLIDS ETHYLENE ACRYLIC ACID AQUEOUS DISPERSIONS AND METHODS OF PRODUCING SAME

[75] Inventors: Frank P. Recchia, New Haven, Conn.; Wilson M. Ferrell; W. Maclin Ferrell, Jr., both of Petersburg, Va.

[73] Assignee: Dominion Chemical Company, Petersburg, Va.

[21] Appl. No.: 94,386

[22] Filed: Jul. 21, 1993

Related U.S. Application Data

[63] Continuation of Ser. No. 795,869, Nov. 20, 1991, abandoned, which is a continuation-in-part of Ser. No. 702,095, May 20, 1991, abandoned.

[51] Int. Cl.$^6$ .............................................. C08C 19/22
[52] U.S. Cl. ................................... 525/369; 525/378; 525/329.9; 525/330.2
[58] Field of Search .................. 524/562; 525/369, 378, 525/329.9, 330.2

[56] References Cited

U.S. PATENT DOCUMENTS

| | | | |
|---|---|---|---|
| 3,674,761 | 7/1972 | Anspon et al. | 525/378 |
| 3,674,896 | 7/1972 | Purcell et al. | 525/329.9 |
| 4,337,181 | 6/1982 | Otey et al. | 524/556 |

*Primary Examiner*—Jeffrey T. Smith
*Attorney, Agent, or Firm*—Low and Low

[57] ABSTRACT

A uniquely treated bead of ethylene acrylic acid (EAA) capable of forming a high solids aqueous dispersion in excess of 38% solids wherein the EAA may be prepared by either batch or continuous processes wherein the EAA is substantially fully reacted with ammonia, sodium or potassium in little or substantial absence of water, followed by a separate aqueous dispersion step, resulting in a unique and quick-drying dispersion material highly useful in coating, adhesive, laminating, ink and similar processes, and wherein operating expense and environmental concerns are at a minimum as a consequence thereof.

The treated EAA may be prepared in a substantially dry to merely moist state for incorporation into an aqueous dispersion with high percentages of EAA having either higher or lower molecular weight with low viscosities as compared to heretofore.

13 Claims, No Drawings

HIGH SOLIDS ETHYLENE ACRYLIC ACID AQUEOUS DISPERSIONS AND METHODS OF PRODUCING SAME

Cross-Reference to Related Application

This application is a continuation of application Ser. No. 07/795,869, now abandoned filed Nov. 20, 1990 which is a a continuation-in-part of the prior application to Ferrell et al U.S. Ser. No. 07/702,095, filed May 20. 1991 now abandoned.

BACKGROUND OF THE INVENTION

Ethylene acrylic acid (EAA) is a ubiquitous substance with wide-ranging uses in industry and commerce. Among these multiferous uses is its incorporation into an aqueous dispersion after batch reaction for diverse coating and like purposes, as are well known in the art.

Aqueous dispersions have significant advantages when used in the coating arts as compared to the common use of organic solvent dispersions and solutions, especially with respect to environmental, fire/explosive hazards, and pollution factors of organic volatiles and the significant difficulty and cost of collecting and satisfactorily handling the same during application and curing of the coatings.

On the other hand, as noted further hereinafter, aqueous-based EAA coating materials, as heretofore available, have relatively high water content, which while explosive-safe and fume safe, require excessive and often unacceptable drying times, whereby in weighing the practical and economic merits of one against the other, the environmentally undesirable organic-based coatings have necessarily remained in widespread usage despite the increasing inveighment thereagainst.

Such prior art teachings as to high mole ratio EAA dispersions are illustrated by the Dow Chemical patent to McCann et al U.S. Pat. No. 3,799,901, the teachings of which are incorporated herein by reference. With respect to the Dow patent teachings as well as to present and indeed heretofore long-term availability of EAA aqueous dispersions, such dispersions are readily commercially available at 35% and 25% EAA solids proportion. The starting EAA bead resin therefor is available from various suppliers, including Dow Chemical Company under the trademark "Primacor" adhesive polymer utilizing beads identified as "5980"or "5990". Such beads are available in ammonia dispersions, as those known as "ADCOTE" of Morton Thiokol Chemical Corporation, with 25% EAA solids proportion using Dow Chemical "5980" beads (high molecular weight) or with 35% EAA solids using Dow "5990" beads (low molecular weight). In like manner, "YUKALON" EAA resin is available from Mitsubishi Chemical Corporation and is comparable to the Dow "5980" resin, while Dow Chemical itself has marketed "Primacor 4983 dispersion using the higher molecular weight "5980" beads, and "Primacor 4990" dispersion using the lower molecular weight "5990" beads. The availability and properties of these products are well known.

When 5980-type beads are provided in such a 25% solids dispersion from these varied commercial sources, the EAA solids are of a size on the order of 500Å and the dispersion is water white in appearance, for example. Such resin as noted prior to incorporation into the dispersion is of relatively high molecular weight and melts at higher temperature.

It is evident that such 25% dispersions with such a high water content present significant problems in coating and other applications with respect to reasonably efficient and rapid drying thereof, with severe demands of both time and heat input in an effort to accelerate drying without damage to the substrate in any way.

As noted, a somewhat higher 35% solids proportion is available, wherein, however, the viscosity is substantially higher with resultant greater difficulty in effecting ready coatings therewith. The 35% dispersion of 5990-type beads further is of lower molecular weight and with a lower melting point as compared to the 25% 5980-type dispersion, thereby handicapping the application of high-heat drying even if the application of the coating is successful. Such known materials, whether "25% " or "35% " in fact can not and do not feasibly serve as replacements for the unwanted organic EAA coatings, despite repeated efforts to utilize the same. It is important to note that a commercially usable 35% solids 5980-type dispersion cannot heretofore be successfully produced.

Efforts to effect suitable dispersions of this type are taught in the aforesaid U.S. Pat. No. 3,799,901 of Dow Chemical Corporation, for example. It will be noted that while following the processes taught in that patent, it is stated that polymer solids as high as "40% " or "50% " may be employed. However, the resultant dispersions at these high solids levels are useless and totally unsuitable for any coating applications. Indeed, the same are described in that patent as "viscous paste" or "very viscous latex", and obviously cannot be employed for paper or other running length substrate coating.

Prior to the present invention, for usable coating purposes and to achieve a serviceable low viscosity, the EAA solids concentration of necessity had to be lowered to about 25% or less, as with the aforesaid 5980-type beads, with resultant increase in water or liquid and unworkable heat requirements and drying times. Such also occurs with dilutions of the high solids "pastes" of the above-noted patent-taught processes.

Accordingly, at the present time, EAA treated by known ordinary procedures for running coating operations, for example, is available only the order of 25% in aqueous dispersions. The techniques for doing so at the present time even to achieve this ratio are not efficient and indeed little more than individual batch processes incapable or quick or ready variation thereof as for incorporation of added constituents that may be desirable.

Further, briefly stated, and with reference to the Dow patent, for example, the known batch techniques of producing even the presently available 25% and 35% dispersions are slow and inefficient as a result of excess quantities of water in bead preparation. Thus, illustratively, EAA beads are placed in a reactor with addition of water and substantial quantities of ammonia (i.e. 0.70 mole ratio ammonium hydroxide) to slowly react, resulting in an initital relatively highly viscous and relatively low EAA concentration aqueous dispersion. The reactor steps may be repeated as desired. Further, such reactor production thereof does not readily permit the controlled introduction of desired additives which are helpful in diverse coating formulations.

While the exact nature of the reaction achieved by the present invention as discussed hereinafter is not precisely known, it is believed that the substantially different and markedly improved results are brought about by the introduction of substantially lower effective amounts of the ammonia directly to the EAA molecules in the significant absence of water. In this manner the ammonia targets reactor sites on the molecule in a manner that the prior art technique is incapable of achieving.

The literature shows that ammonium hydroxide ($NH_4OH$), may be used to treat a carboxylic acid, resulting in an ammonium salt. In such prior art treatments, high EAA concentrations, approaching 35% solids and of flowable character, are unknown. Reference is made to a publication of Dow Chemical Company entitled "Separation of Ionomer Dispersions" from which it is clear that the use of high mole ratio hydroxides result in non-pourable gels and undigested EAA whenever high solids are sought, which materials are undesirable and all but useless.

Brief Summary of the Invention

The present invention relates to the unique formulation of low viscosity, quickly driable and readily usable high solids EAA aqueous dispersions of 38% solids or higher, as well as also the efficient production of such ethylene acrylic acid aqueous dispersions having a significantly high solids-to-water ratio, by special treatment of the EAA prior to dispersion preparation, which achieves unique and highly desirable results.

The present invention, inter alia, in unique and novel manner, advances the teachings of the aforementioned Dow patent in major and significant respects. That is to say, in following the processes of that patent for high EAA solids contents, a virtually solid block of material results. It is a chief purpose of this invention to produce a low viscosity, low mole ratio, coatable aqueous dispersion having unique high EAA resin content.

In the prior art, a high relative proportion of water along with an alkali salt as sodium or potassium, for example, is combined with the EAA in an effort to produce a latex, requiring relatively high proportions of ammonia for the reaction, resulting in a highly viscous product. With low mole ratios of the salt, say below 0.30 m.r., in an effort to reduce viscosity, there results substantial untreated, undigested bead material of the 5990 type, whereby the product is virtually useless. With higher mole ratios, i.e. 0.50 m.r. KOH, a thixotropoic solution results like a gel, and being thus unusable, must be diluted with water to about 10–15% solids to render the same pourable, whereby the exceedingly high and unwanted water content is therefore present.

The instant invention embraces the discovery that minimal or low amounts of $NH_3$ as $NH_4OH$ (or alkali metal salts as KOH) should be provided to loosen up the EAA molecule in forming the dispersion, whereby the low volume $NH_3$ can react fully with the EAA to produce a high reactant yield bordering on 100%. In this regard, then, much lower ammonia (or sodium or potassium salts) is employed than in the processes of the Dow patent, whereby the ratio of ammonia to EAA is far lower than contemplated or achieved in the teachings heretofore.

As specially treated herein, the resultant EAA solids product may be as high as 95-98% solids as initially reacted, but more commonly on the order of 45–55%, and with high melting points as compared with the former prior art low-solids dispersions, whereby the products of the instant invention may be quickly and effectively dried with less heat input in view of the high solids level and with no coating or substrate damage. Further, the dispersions of the invention, notwithstanding the high-solids character thereof, are of sufficiently low viscosity so as to in no way impede ready application thereof to substrates. Further, especially in the case of Na ionomer, as an applied film, the treated EAA of the invention has superior engineering properties, as increased tensile strength, higher melting point, and with minimum or no pinholing. Further, ammonia treatment also results in similar enhanced properties.

In addition, such unique relative concentration of invention-treated EAA, by reducing water bulk without loss of desirable application properties, facilitates ease of transportation and utilization in numerous and diverse industrial and commercial coating and and adhesive processes.

Indeed, in producing a high solids EAA dispersion according to the present invention, the EAA product resulting from the inventive process can be sold in the form of beads, powder, flakes, or even gels, treated in accordance with the invention so as to be nearly "dry" to the industrial consumer, who then can add such water for dilution as may be required for specific application purposes, while still achieving low viscosity 38+% EAA solids content, with manifest advantages in shipping costs and versatility of usage, or fully ]prepared ab into in dispersion for sale.

According to the present invention, with respect to production of the treated EAA suitable for high concentration dispersion, the same can be prepared not only by individual batch processes, and may also be reacted continuously and delivered from an extruder, as a screw extruder. Such form of continuous preparation thereby provides in unique manner an ability to have a desired temperature control along the extruder barrel length, and wherein at selected locales therealong at differing stages of the reaction process, desired additives for reaction, color, filler, etc., may be successivelly introduced into the mix barrel before the final treated EAA extrudate emerges from the nozzle.

In this manner, temperature and pressures can be readily controlled in a continuous production process.

Indeed, with the specially treated EAA extrudate as prepared in an extruder in a substantially continuous basis, the extrudate can be sliced into chips or pieces of desired size, thereafter packed, and subsequently used when necessary by an end user by merely placing the chips into water for a short time, as 15-20 minutes, with appropriate agitation to achieve a desired high-solids dispersion as above noted for coating or other operations.

Illustrative of that which is currently available are untreated EAA bead products of the Dow Chemical Company as aforementioned, identified as "Primacor" Dow 5980 (h.m.w.) and Dow 5990 (l.m.w.) beads. The 5980 beads when treated as in the aforesaid Dow patent and placed in dispersion (marketed as a "4893"dispersion) is called "water white" and has an EAA concentration of 25%, while the 5990 beads so treated result in a milky dispersion of a 35% concentration. These are the best known commercially usable dispersion products, and which are below the significant concentrations attained by the present invention.

Dispersions made with treated EAA beads obtained by practice of the inventive treatment method herein, with both 5980 beads and 5990 beads, have EAA concentrations in excess of 38% which are not heretofore commercially known or thought capable of being successfully produced. The practice of the present invention not only achieves these surprisingly high concentrations, but also may do so with ease of production, ease of treatment modifications, ease of shipping, ease of handling, ease of drying and nominal-to-note toxic or environmental hazard concerns.

The utility of the higher concentrations is especially important in the wide usage of aqueous EAA in diverse coating and adhesive compositions, for example. Thus, with an EAA concentration of 25–35% in ordinarily or presently prepared aqueous dispersions as noted above, the significant water base greatly delays drying time of the applied coating and increases costs thereof, both in slower throughput and in increased and prolonged heat requirements.

While EAA can be dispersed in organic carrier liquids resulting in a whole or partly organic-based coating or adhesive having significantly shorter drying time requirements than with water, environmental considerations involving organic and volatile vapors increasingly mandate, if feasible, far less pollution-prone water based carriers for coatings.

Nonetheless, the invention also contemplates the useful incorporation, if desired, of small amounts of organic materials, as isopropyl alcohol (IPA) or N-methyl pyrrilidone (NMP), in low percentages in the initial unique treatment of the EAA beads to facilitate the reaction.

As indicated, prior efforts to produce EAA aqueous dispersions following bead treatment in a batch reactor with ammonia and water struggle to achieve a barely serviceable and low 25% EAA density concentration, while prior preparation of a 35% EAA density, is in practical terms unusable, as contrasted with dispersions resulting from the special treatment of the EAA beads in the present invention, as aforesaid, notwithstanding the common usage of water ($H_2O$) and ammonia ($NH_3$) in both the prior art practice and the present unique inventive processes, by virtue of the sharply different methods of treatment.

The product and process of the invention herein are also highly useful for inks as well as surface coatings, overall pinhole-free films, and laminating adhesives, as in film-film, film-foil combinations, for example.

In all aspects of the invention unwanted organic solvents are avoided, in compliance with increasingly stringent environmental requirements.

DETAILED DESCRIPTION OF THE INVENTION

The essence of the invention is the unique preparation of the EAA beads so that the same are capable of forming a high-solids aqueous dispersion that achieves the necessary coating characteristics yet with sufficiently reduced viscosity for ready and facile application, as on a web fed through a high speed rotary gravure press, for example, and with ease of drying without coating damage, as a function of the high-solids, high melting point, substantially less-water character of the dispersion.

The EAA molecule includes ethylene groups which are difficult to solvate. To this end, a chief feature of the invention resides in the discovery of means for enhancing access to carboxylic acid receptor sites on the EAA molecule for reaction with ammonia ($NH_3$) with a view toward solvating the ethylene. The resultant polymer product when dispersed in water, results in a dispersion having markedly lower viscosity at high EAA concentrations, heretofore unsuccessfully attained, and the necessary and desirable quick-dry characteristics and other practical engineering properties notwithstanding the high-solids nature thereof.

Heretofore it had not been feasible to provide high-solids EAA aqueous dispersions greater than 35% solids of any practical utility, as above-noted 5990 ammonia-treated product, as the same is so viscous so as to be virtually incapable of flow or physical application as a coating on a substrate, or with inks, etc., while treated 5980 beads above 25% and towards 35% concentration becomes a non-flowing gel. There is also the problem of undigested, unreacted polymer in the prior treatment of 5980 beads above 25% solids.

By the inventive treatments herein, however, unique high-solids EAA aqueous dispersions may be provided which are highly serviceable and desirable, and are also liquid and flowable at such high concentration. As earlier noted, the novel treated EAA pellets or beads therefor may be produced by either a "batch" process in single charge reactors, or as a further feature of the invention by a "continuous" process as in largely conventional extruding equipment, per se, providing special aspects of reaction and control heretofore unknown. The essential aspects thereof are set forth hereinafter:

(1) Batch Process Technique According to the Invention:

In the preparation of the EAA dispersion according to the invention in a basic batch process thereof, untreated EAA beads as procured from Dow Chemical or other manufacturers are placed in an airtight vessel in the substantial absence of water.

In accordance with the invention, for example, a quantity of 0.25 mole ratio aqueous ammonium hydroxide ($NH_4OH$) is added to the EAA beads, and the substances are agitated, as by tumbling until a vacuum develops, wherein the ammonia is fully taken up by and reacted with the EAA beads.

This very low mole ratio ammonia source compares with heretofore employed 0.39 mole ratio ammonia to obtain maximum 35% solids with 5990 EAA beads, and with even higher 0.79 mole ratio ammonia used with 5980 beads to attain as much as 25% solids.

The ammonia is preferably about 26 Å Baumé aqueous ammonia. No externally provided heat is necessary, and the in-drum reaction between the EAA and the $NH_4OH$ occurs at ambient temperature. During the treatment period, which may be for about two hours at room temperature, it appears that the aqueous ammonia is totally absorbed into the discrete EAA beads. In so doing, a substantial relative vacuum develops within the airtight vessel as the beads become ammoniated. The beads may partake of a slight color change.

After a period of time, the vessel is opened and the treated beads, or now-ammoniated beads, are removed. It is important to observe that upon opening the vessel, there is no smell of ammonia ($NH_3$) therefrom, which follows from the presumed absorption of the $NH_4OH$ as noted above.

After this reaction, water ($H_2O$) is slowly added to the treated beads in an open vessel to achieve a desired solids level. Illustratively for a level on the order of 39.5% solids, the water is added with agitation or stirring, and at this time external heat may be provided, as by a steam jacket to about 195° F. or so. The reaction product is then permitted to cool, with light agitation.

As a preferred option, the addition of the water is in a stepwise fashion, i.e. ⅓ H₂O, stirring, next third, stirring, the last third, and stirring.

The solids level is tested for the final solids contents desired for the coating, adhesive, or ink application, and sufficient final water is admixed as necessary to obtain the desired high solids level, e.g. 38% or more.

The resultant dispersion is then preferably filtered through increasingly fine mesh, as 20, 60, and 150 mesh, to remove any possibly unreacted pellets of EAA and any diverse unwanted fibers or detritus.

Thus, in one instance, at about 150° F., a sample made with h.m.w. beads was taken and found to be 38% EAA solids Water was added to lower the solids to 35% at room temperature, and the dispersion had a viscosity sufficiently low to permit ready coating onto a substrate, a product heretofore unattainable.

The resultant unique 35% treated h.m.w. solids dispersion produced according to the ammonia treatment form of the invention has numerous beneficial and desirable characteristics, including:

(1) Minimal ammonia gas evolves or is driven off for the treated EAA product by virtue of the exceedingly low mole ratio above noted, thereby avoiding the cost and concern of environmentally objectionable excess ammonia fumes.

(2) This product contains some 40% additional EAA solids with comparable reduction in water as compared with the hitherto highest available 25% solids dispersion with 5980-type beads, with more effective coating of substrates, yet with no adverse viscosity of production difficulties.

(3) Drying or curing of the 38+% treated solids dispersion made according to the invention is on the order of one-third faster than the virtually unusable prior "4990" dispersion made from 5990 resin (low molecular weight of about 12,000) product noted above, with significantly less adverse effect on the substrate and energy consumption. Further, as indicated, a 35% solids product with the 5980 high molecular weight (18,000) resin was heretofore unattainable in any event.

It is very important to note that while in the illustrative example the solids level is at 38% or more, the aqueous dispersion of the invention herein is eminently usable, with a relatively high melting point and a like molecular weight, which in actual fact contrasts sharply and totally with the virtually unusable 35% dispersion of the prior art treated beads, as well as the theoretically usable but in fact impractical 25% prior art dispersion for coating/adhesive and like purposes.

Alcohol/OH⁻ Modification Process

In view of the relative unacceptability of the prior art EAA product because of unacceptable viscosity, long drying time, etc., efforts were made to enhance the same and lower viscosity of the dispersion by the addition of means other than water. Thus, in the prior art, isopropyl alcohol (IPA) has been added to the completed and reacted dispersion long after the EAA has been treated to make the same. In this prior art usage, the IPA is primarily to dilute the dispersion and permit somewhat speedier drying of the same when applied as a coating. No reaction occurs with the EAA when the IPA is used as a diluent in this manner.

While reducing viscosity and enhancing drying, such use of the IPA introduces an unwanted alcohol or like organic volatile to cope with environmentally along with the gaseous ammonia noted earlier.

According to the present invention, the treatment of the EAA may optionally and preferentially include the introduction of isopropyl alcohol (IPA) or NMP, as a source of organic solvating medium introduced in small quantity (i.e. 5% or less) directly to the EAA beads at the time of initial reaction and before completion therof, and provides differing results, namely smaller ultimate EAA particle size, and lower mole ratio requirements for the ammonia, as well as enhancing the reaction. The use of the alcohol or NMP in the present invention, then, is to enhance the reaction treatment, and not as a quick-dry addition to the dispersion proper effected subsequent to bead treatment.

Further, limited introduction of such an organic additive, as for example NMP, IPA, Dr propylene glycol, permits the mole ratio of the $NH_4OH$ to drop to as little as 0.25 or even 0.10, while yet resulting in the ability to produce as high as a 40.5% solids EAA dispersion with good viscosity and coating ability.

This contrasts markedly with the teachings of the literature and the aforesaid Dow patent, which achieve only a 25% EAA solids result using the 5980 resin reacted with a substantially higher mole ratio of ammonia, such as 0.70 mole ratio or higher. Similarly, the inventive results contrast sharply with the 35% solids product of the 5990 resin at the 0.35 or higher mole ratio ammonia source.

The aforesaid relaxation of the EAA bead molecule is unnecessary with ammonia, which is capable of entering the bead and reacting with the acid sites therein, but has the advantage as noted of further reducing the amount of ammonia required. In the case of a caustic reaction as with NaOH or KOH, rather than ammonia, the use of the solvating additive is preferred to sufficiently relax the EAA molecule to expose the receptor sites for reaction. While IPA, NMP, and propylene glycol have been specifically mentioned, it would appear that any good solvating medium or chemical with solvating properties having an OH⁻ group effective to expose the acid receptor sites in the EAA molecule before reaction would be desirable to permit the reaction with a salt or ammonia in accordance with the invention.

(2) Continuous Treatment Process According to the invention:

The present invention includes the capability of practicing the same on a generally continuous basis in contrast to a batch or single lot basis.

Thus a substantially conventional twin screw mixing extruder may be provided into which substantially dry EAA beads are fed from a Banbury or other blade mixer for treatment. The screw extruder advances, and masticates the beads between the screw flights as the mass moves toward the discharge nozzle from which the in-extruder treated EAA issues in rodlike form.

At one or more selected locales along the extruder length, $NH_3$ is injected directly into the moving mass to react therewith prior to emergence from the extruder nozzle. The speed of the extruder and the locale or locales of $NH_3$ introduction are selected so as to permit completion of the reaction prior to exit. In this regard, the extruder barrel can utilize conventional heating and cooling jackets therearound which are controlled as desired to effect the result.

Ammonia in substantially gaseous form as $NH_3$ may be introduced directly into the extruder and into the EAA polymer which will have trace water, producing a solid material at room temperature which is estimated to be substantially 100% ammonia salt of EAA polymer with only trace/catalytic amounts of water. This EAA solid can then be dispersed into hot water to obtain a desired concentration suitable for coating at any lower level, but including the higher levels of 40–55% which permits ease of coating application coupled with rapidity of drying of the coating on the substrate.

In like manner, isopropyl alcohol and water may be injected directly along the treated barrel, the rodlike material emerging from the nozzle at a 40% or higher solids ratio, then being cut or fractured as necessary and blended with added water to attain the desired solids level for coating purposes.

The basic technique to achieve a high EAA concentration according to the invention is to take the EAA polymer in free acid form, melt and masticate the same as in a heated extruder, and then incorporate and react ammonia in gaseous form along with a minimum of water as necessary. In this manner, the ammonia is trapped in the EAA which is substantially a solid, after which the reacted product can be easily and quickly converted to a desired dispersion concentration.

This contrasts sharply with prior art techniques of effecting batch fabrication of EAA dispersions with high concentrations of $NH_4OH$ and water in a reactor wherein 25% to 35% concentrations of EAA are the best practically obtainable. The excess of $NH_4OH$ present in the standard prior art dispersions, made as from the aforementioned Dow 5880 and 5980, is evident when on drying the EAA coatings made from the prior art process to produce the residual film, substantial $NH_3$ is driven off, and wasted or recovered from the atmosphere at additional cost. By the instant invention, the use of ammonia is reduced on the order of one-half, with attendant obvious benefits in all respects.

In the prior art practice, as noted, substantial quantities of water, ammonium hydroxide, and EAA beads are admixed and reacted in a reactor vessel substantially simultaneously. Specifically, to a quantity of water in the reactor or other vessel, the ammonium hydroxide and beads are added, the vessel closed, and appropriate heat and agitation supplied.

In the invention herein, however, the EAA beads and the ammonia (or sodium as NaOH or potassium as KOH) are admixed with only nominal water, namely only that required to carry the reactant, with no additional water. This may be effected as desired, but a preferred and efficient manner is in an extruder, wherein the location, timing, and temperature of ingredients, especially the $NH_4OH$, can be precisely controlled, and in the absence of additional water. In this regard, the enhancing additive having an alcohol $OH^-$ radical, as IPA, propylene glycol, etc., for example, when extruder-processed, may be controlled and barrel-introduced prior to introduction of the principal reactant to the EAA. Alternatively, the beads may be treated with the $OH^-$ additive before being introduced into the extruder barrel.

ILLUSTRATIVE TEST RESULTS

A series of tests were performed which demonstrate the unique factors entering into the invention. In each test, a quart bottle was filled with exactly 300 grams of EAA beads.

Test 1: (Prior Art)

39.3 grams of water were added, and the bottle was agitated at room temperature by rolling for 1 week, The agitation is generally comparable to that of a Siena mixer or a ribbon blender.

After one week, and after additional extended periods of time, the water was still present, with no significant absorption into the EAA beads. Essentially, water is repelled by the EAA beads under such conditions, as is known in the art.

Test 2:

In this test, 5% by weight IPA alone was added, the IPA being substantially entirely free of any water.

In approximately one half-hour, all liquid (the IPA) was entirely absorbed by the beads. The beads were somewhat swollen in size.

Test 3:

In this Test, no free water was provided, and a 0.26 mole ratio of a 25% solution of NaOH along with about 45 grams IPA added at the same time, with similar agitation. No heating was provided.

In this instance, all liquid was absorbed into the beads after one day, and no free water whatever was visible. The beads were somewhat swollen in size.

The resultant material in aqueous dispersion provided an excellent coating, with very good reflectivity, a harder surface and a higher melting temperature than presently known.

Test 4:

In this test, similar to Test 2, 15% NMP was added, and comparable results were attained as in Test 2.

Test 5:

In this test, 26 Å Baumé aqua ammonia was added to the EAA without any additional water. The results were comparable to test 3, including the highly desirable dispersion and coating qualities and characteristics.

With the beads penetrated and softened by the additive, thereby relaxing the EAA molecule to expose the acids groups, and with the water absorbed as in Test 2, the ammonia attacks the receptor sites of the EAA molecule to effect the reaction.

Generally it appears that alkaline materials will achieve this result. Sodium, as in NaOH is effective, as is anhydrous or aqueous ammonia. Potassium as in KOH, would achieve similar results, and other alkaline metal bases as LiOH, etc. Similarly, other amines are operative.

In the prior art, EAA beads were in an environment of high water content, at which time $NH_3$ was added to effect the desired site reaction in the EAA molecule. With such excess amounts of $H_2O$ present, the amount of ammonia to overcome the presence of so much water in accessing the EAA reaction sites is so great that the resultant reactant product was solid, nearly solid, or so highly viscous so as to be unusable in practical terms, as the material would utterly incapable of reasonable flow, let alone the low viscosity flow necessary for use in higher speed coating equipment.

The product of the instant invention, by contrast, provides a high solids EAA coating material which is suitable for use with high-speed coating equipment, which results in a substantial savings of time, energy and resulting production costs.

The properties achieved in EAA materials made in accordance with this invention are evident in the table of test results below. Overall superior coating and physical properties with ease of manufacture of the aqueous dispersion are achieved. Illustratively, substantial increas in tensile yield and much lower relative viscosity with ready pourability and substantially lower drying times accompany the high solids content of the dispersions of the invention.

ILLUSTRATIVE SOLIDS DISPERSIONS MADE BY THE INVENTION

|  | Sample A [1] | Sample B [2] | Sample C [3] |
|---|---|---|---|
| Ultimate Tensile, PSI | 2160 | 2812 | 1848 |
| Tensile Yield, PSI | 643 | 2751 | 1879 |
| Secant Modulus 2% PSI | 2360 | 2750 | 1950 |
| Elongation, % | 558 | 283 | 252 |
| Surface Tension (dyne/cm) | 38 | 37 | 34 |
| Vicat Softening, C.° | 43 | 46 | 50 |
| Melting Point, DSC, C.° | 77.7 | 79.1 | 77.3 |
| Hardness, Shore D | 40 | 49 | 46 |

Legend:
[1] 34–35% ammonium salt solids dispersion made from "5980" resins, heretofore unattainable. The ammonia is entirely driven off.
[2] 38% solids ionomer dispersion made from "5980" resins partially neutralized with .25 mole ratio NaOH, heretofore unattainable. There is a Na residuum.
[3] 38% solids ionomer dispersion made from "5990" resins and with .25 mole ratio NaOH, heretofore unattainable with this lower molecular weight polymer.

What is claimed is:

1. A process for the production of a reacted ethylene acrylic acid (EAA) product comprising the steps of:
   providing a quantity of EAA polymer,
   selecting a reactant from the group consisting of ammonia, ammonium hydroxide, sodium hydroxide, and potassium hydroxide,
   adding a quantity of the selected reactant in the range of 0.10 to about 0.25 mole ratio to the EAA under dry conditions in an amount sufficient for the selected reactant to swell the EAA polymer to expose reactor sites of the molecule so that the positive ions of the selected reactant can reach the reactor sites of the EAA molecules thereby to form the corresponding EAA salts thereat,
   mixing the selected reactant and the EAA, thereby permitting the same to react together to form EAA salts as a dry product with no additional water added thereto other than that initially present in the said selected reactant.

2. The process of claim 1 wherein the reaction takes place in a closed vessel.

3. The process of claim 1 further comprising the step of terminating the reaction upon development of a vacuum in the closed vessel.

4. The process of claim 1 wherein said adding the mixing steps occur at room temperature and without the positive addition of external heat.

5. The process of claim 1 wherein said adding and mixing steps are effected in an extruder, and further comprising the step of extruding the said dry product from the extruder.

6. The process of claim 5 further comprising the step of severing the extruded product into discrete pieces.

7. The process of claim 1 wherein said EAA polymer is in the form of discrete beads.

8. The process of claim 1 further comprising the step of admixing a solvating bead-swelling medium to the EAA at the said mixing step of the selected reactant and the EAA to facilitate ready reaction of the EAA with the selected reactant to form the EAA salts.

9. The process of claim 8 wherein the bead-swelling medium is selected from the group consisting of isopropyl alcohol (IPA), n-methyl pyrrilidone (NMP), and propylene glycol.

10. The process of claim 8 wherein said adding and mixing steps occur at room temperature and without the positive addition of external heat.

11. The process of claim 1 further comprising the step of subsequently admixing the reacted EAA with water to form an aqueous dispersion of the EAA in the water vehicle.

12. The process of claim 11 wherein the proportion of EAA solids in the dispersion is between 35% and 55%.

13. The process of claim 12 wherein the proportion of EAA solids in the dispersion is 38% or greater.

* * * * *